United States Patent [19]

Gauffres

[11] 4,444,012
[45] Apr. 24, 1984

[54] EXHAUST PIPE ARRANGEMENT FOR A TURBOCHARGED MULTI-CYLINDER INTERNAL COMBUSTION ENGINE HAVING CATALYTIC CONVERTERS

[75] Inventor: Ulrich-Joachim Gauffres, Stuttgart, Fed. Rep. of Germany

[73] Assignee: Daimler-Benz Aktiengesellschaft, Stuttgart, Fed. Rep. of Germany

[21] Appl. No.: 369,647

[22] Filed: Apr. 19, 1982

[30] Foreign Application Priority Data

Apr. 18, 1981 [DE] Fed. Rep. of Germany ....... 3115739

[51] Int. Cl.³ ............................................. F02B 37/00
[52] U.S. Cl. ....................................... 60/602; 60/276; 60/280; 60/288
[58] Field of Search ................. 60/276, 280, 288, 600, 60/601, 602

[56] References Cited

U.S. PATENT DOCUMENTS

| | | | |
|---|---|---|---|
| 3,791,143 | 2/1974 | Keith et al. | 60/288 X |
| 4,202,176 | 5/1980 | Mezger | 60/600 |
| 4,251,990 | 2/1981 | Norimatsu et al. | 60/276 |

*Primary Examiner*—Michael Koczo
*Assistant Examiner*—Peggy A. Neils
*Attorney, Agent, or Firm*—Craig & Burns

[57] ABSTRACT

An exhaust pipe arrangement for internal combustion engines which includes an exhaust gas turbocharger, a bypass conduit for circumventing the turbocharger, a blow off valve, a starter catalyst disposed in an exhaust pipe, an oxygen sensor, and a main catalyst connected downstream of the turbocharger, starter catalyst, and oxygen sensor. To reduce the exhaust gas counterpressure and relieve the load on the starter catalyst at the same time, the starter catalyst is arranged upstream of a junction of the bypass conduit entering into the exhaust pipe.

3 Claims, 1 Drawing Figure

U.S. Patent
Apr. 24, 1984
4,444,012
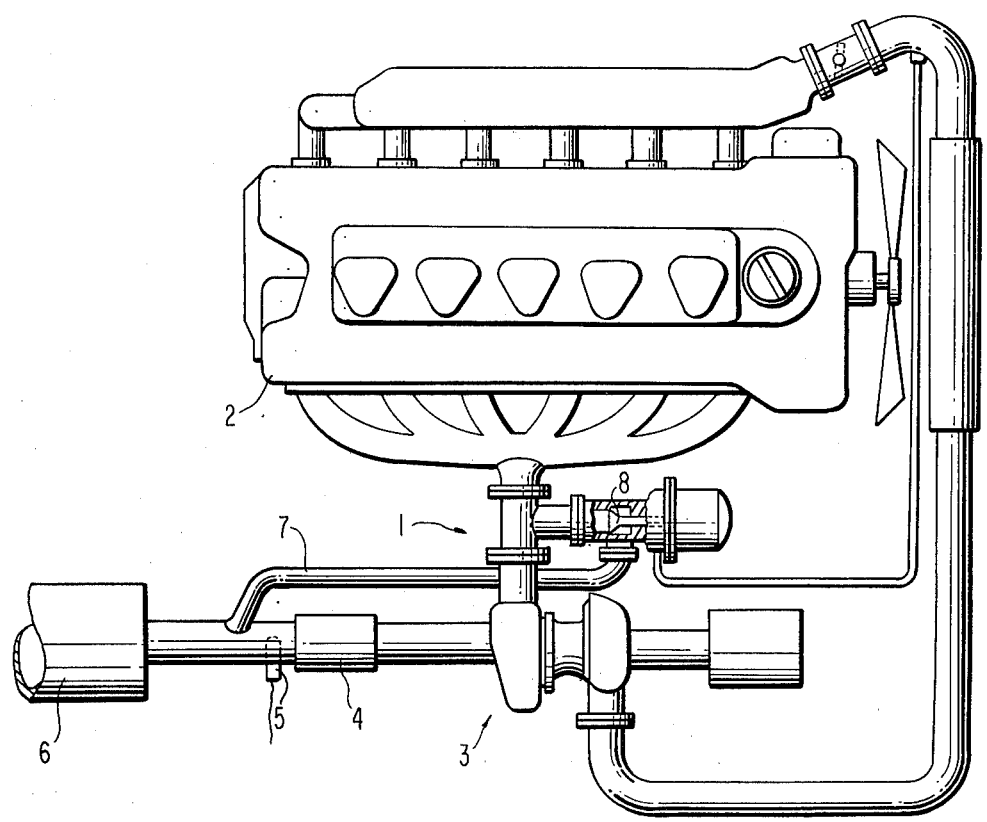

EXHAUST PIPE ARRANGEMENT FOR A TURBOCHARGED MULTI-CYLINDER INTERNAL COMBUSTION ENGINE HAVING CATALYTIC CONVERTERS

The present invention relates to an exhaust disposal system and, more particularly, to an exhaust pipe arrangement for a multi-cylinder internal combustion engine which includes an exhaust gas turbocharger, a bypass conduit means, terminating in an exhaust pipe, for circumventing the turbocharger, a blow-off valve, disposed in the bypass conduit means and controlled by the supercharging pressure of the turbocharger, a starter catalyst located in the exhaust pipe in a zone of the junction of the bypass conduit means and exhaust pipe, an oxygen sensor, and a main catalyst connected downstream of the exhaust gas turbocharger, starter catalyst and bypass conduit means, as viewed in a normal flow direction of the exhaust gases.

In exhaust pipe arrangements used as a mass produced component in motor vehicles, the starter catalyst is disposed in a zone of the junction of the bypass conduit and exhaust pipe so that, at high loads of the internal combustion engine and upon attaining of the maximum throughflow of the exhaust gas turbocharger, the residual exhaust energy is blown off through the bypass conduit into the exhaust pipe downstream of the exhaust gas turbocharger and also through the starter catalyst.

The aim underlying the present invention essentially resides in reducing an exhaust gas counterpressure in case of a high load and high rotational speed of the internal combustion engine while simultaneously diminishing the load on the starter catalyst.

In accordance with advantageous features of the present invention, the starter catalyst is arranged at a position upstream of the junction point of the bypass conduit means with the exhaust pipe.

By virtue of the above-noted features of the present invention, the primary steam of exhaust gases and the blown off quantity is joined in an exhaust pipe section line between the starter catalyst and the main catalyst, with the blown off quantity being conducted merely through the main catalyst at high loads and high rotational speeds of the engine so that only a portion of the entire amount of exhaust gas flows through the starter catalyst.

An advantage of the constructional features of the present invention resides in the fact that the starter catalyst may be made so as to be more compact resulting in reducing the manufacturing costs and enabling a more rapid activation of the starter catalyst since it warms up more quickly.

Moreover, by virtue of the special disposition of the starter catalyst in the exhaust pipe arrangement in accordance with the present invention, a more linear construction of the bypass conduit is possible thereby affording more favorable flow conditions. Additionally, a further advantage resides in the fact that the positioning of the bypass valve can be more freely selected.

By changing the location of the starter catalyst, a different arrangement is necessary for the oxygen sensor in order to prevent extraneous air, entering the bypass conduit through the valve line of the blow off valve, from also being measured and transmitting false information with regard to the composition of the exhaust gases to the fuel processing system.

Consequently, in accordance with still further features of the present invention, the oxygen sensor is disposed downstream at a position behind the starter catalyst and upstream of the junction of the bypass conduit means with the exhaust pipe.

Accordingly, it is an object of the present invention to provide an exhaust pipe arrangement for a multicylinder internal combustion engine which avoids, by simple means, shortcomings and disadvantages encountered in the prior art.

Another object of the present invention resides in providing an exhaust pipe arrangement for a multicylinder internal combustion engine which effectively reduces the counterpressures of the exhaust gas in cases of high load and high rotational speeds of the internal combustion engine.

Another object of the present invention resides in providing an exhaust pipe arrangement for a multicylinder internal combustion engine which minimizes the load on a starter catalyst of the exhaust system.

A still further object of the present invention resides in providing an exhaust pipe arrangement for a turbocharged multicylinder internal combustion engine which significantly improves the activation of a starter catalyst of the exhaust system.

Yet another object of the present invention resides in providing an exhaust pipe arrangement for a multicylinder turbocharged internal combustion engine which optimizes the flow conditions of exhaust gases through the exhaust system.

Yet another object of the present invention resides in providing an exhaust pipe arrangement for a turbocharged multicylinder internal combustion engine which ensures the providing of accurate exhaust gas composition information to a fuel processing system of the engine.

A still further object of the present invention resides in providing an exhaust pipe arrangement for a turbocharged multicylinder internal combustion engine which functions realiably under all operating load conditions of the engine.

These and other objects, features, and advantages of the present invention will become more apparent from the following description when taken in connection with the accompanying drawing which shows, for the purpose of illustration only, one embodiment in accordance with the present invention, and wherein:

The single figure of the drawing is a partially schematic plan view of an exhaust pipe arrangement for a turbocharged multicylinder internal combustion engine constructed in accordance with the present invention.

Referring now to the single FIGURE of the drawing, according to this figure, an exhaust pipe arrangement includes an exhaust gas turbocharger generrlly designated by the reference numeral 3, a starter catalyst 4, an oxygen sensor 5, and a main catalyst 6 connected in succession, as viewed in a normal flow direction of exhaust gases, in an exhaust pipe generally designated by the reference numeral 1, constructed as a manifold, 4, for example, a 6-cylinder internal combustion engine 2.

A bypass conduit 7 branches off from the exhaust pipe 1 and bypasses or circumvents the exhaust gas turbocharger 3, with the bypass conduit 7 terminating in the exhaust pipe 1 at a position downstream of the starter catalyst 4 and the oxygen sensor 5. The bypass conduit 7 includes a blow off valve 8 which automatically opens during a full load operation of the internal combustion engine 2 upon the attainment of a specific supercharging pressure in order to enable a blow off of the residual exhaust gas energy through the bypass conduit 7 into the exhaust pipe 1 downstream of the starter catalyst 4 and the oxygen sensor 5.

By virtue of the disposition of the starter catalyst 4, only a portion of the entire amount of exhaust gas is conducted through the starter catalyst 4 thereby enabling the starter catalyst 4 to have a longer operating life. Moreover, due to the special arrangement of the oxygen sensor 5 at a position upstream of the junction of the bypass conduit 7 with the exhaust pipe 1, no false information regarding the composition of the exhaust gas is transmitted to the fuel processing system (not shown) since any extraneous air entering the bypass conduit 7 through the valve line of the blow off valve 8 is conducted directly into the main catalyst 6.

While I have shown and described only one embodiment in accordance with the present invention, it is understood that the same is not limited thereto but is susceptible of numerous changes and modifications as known to one having ordinary skill in the art and I therefore do not wish to be limited to the details shown and described herein but intend to cover all such modifications as are encompassed by the scope of the appended claims.

I claim:

1. An exhaust arrangement for a multicylinder internal combustion engine, the exhaust arrangement comprising an exhaust pipe means, an exhaust gas turbocharger means, a bypass conduit means for circumventing the exhaust gas turbocharger means, the bypass conduit means terminating in the exhaust pipe means, blow off valve means being controlled by a supercharging pressure of the exhaust gas turbocharger means disposed in the bypass conduit means, a starter catalyst means being arranged in the exhaust pipe means at a position upstream of a junction of the bypass conduit means and the exhaust pipe as viewed in a normal flow direction of exhaust gases, an air/fuel ratio detector means being arranged in the exhaust pipe means at a position upstream of the junction of the bypass conduit means and the exhaust pipe means, a main catalyst means being arranged at a position downstream of the exhaust gas turbocharger means, starter catalyst means, and air/fuel ratio detector means, as viewed in a normal flow direction of exhaust gases.

2. The exhaust arrangement according to claim 1, further comprising the main catalyst means being disposed downstream of the junction of the bypass conduit means and exhaust pipe means.

3. An exhaust arrangement according to one of claims 1 or 2 further comprising the oxygen sensor means being disposed in the exhaust pipe means at a position between the starter catalyst means and the junction of the bypass conduit means and the exhaust pipe means.

* * * * *